United States Patent
Sato et al.

(10) Patent No.: US 8,685,316 B2
(45) Date of Patent: Apr. 1, 2014

(54) NI-BASED HEAT RESISTANT ALLOY, GAS TURBINE COMPONENT AND GAS TURBINE

(75) Inventors: Jun Sato, Hitachi (JP); Shinya Imano, Hitachi (JP); Hiroyuki Doi, Tokai (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 13/286,274

(22) Filed: Nov. 1, 2011

(65) Prior Publication Data

US 2012/0141293 A1   Jun. 7, 2012

(30) Foreign Application Priority Data

Dec. 2, 2010 (JP) .................................. 2010-268921

(51) Int. Cl.
*C22C 19/05* (2006.01)
*F01D 5/00* (2006.01)

(52) U.S. Cl.
USPC ...................................... 420/448; 416/244 R

(58) Field of Classification Search
CPC .... C22C 38/44; C22C 19/055; C22C 19/056; C22C 38/46; C21D 6/02
USPC ...................................... 420/448; 416/244 R
See application file for complete search history.

(56) References Cited

FOREIGN PATENT DOCUMENTS

| GB | 1344917 | 1/1974 |
|---|---|---|
| JP | 2000-192179 | 7/2000 |
| JP | 2000-192208 | 7/2000 |

OTHER PUBLICATIONS

EP Search Report of Appln. No. 11189623.9 dated Jun. 25, 2012 in English.

*Primary Examiner* — Jessee Roe

(74) *Attorney, Agent, or Firm* — Antonelli, Terry, Stout & Kraus, LLP.

(57) ABSTRACT

A Ni-based heat resistant alloy has a composition of, by mass percent, carbon: 0.001 to 0.1%, chromium: 16 to 22%, aluminum: 0.5 to 1.5%, molybdenum: 0.1 to 2.0%, tungsten: 0.1 to 6.0%, niobium: 3.5 to 5.5%, titanium: 0.8 to 3.0%, iron: 16 to 20%, and the balance being nickel and inevitable impurities. A parameter Ps indicating a segregation tendency is in a range of Ps≥−3.5. The parameter Ps is represented by Formula (1).

$$Ps = 1.05 \times Al\ content + 0.6 \times Ti\ content - 0.8 \times Nb\ content - 0.3 \times Mo\ content \qquad (1)$$

6 Claims, 1 Drawing Sheet

NI-BASED HEAT RESISTANT ALLOY, GAS TURBINE COMPONENT AND GAS TURBINE

FIELD OF THE INVENTION

The present invention relates to a Ni-based heat resistant alloy having improved segregation properties and capable of being applied to large-sized components. The invention also relates to a gas turbine component including the alloy, and a gas turbine.

BACKGROUND OF THE INVENTION

It is effective to rise a combustion temperature for increasing an efficiency of a gas turbine. Therefore, a Ni-based heat resistant alloy having high-temperature strength is employed for various parts in components for the gas turbine. The Ni-based alloy contains large amounts of solid-solution strengthening elements such as tungsten, molybdenum or cobalt and precipitation strengthening elements such as aluminum, titanium, niobium or tantalum, and therefore has excellent high-temperature strength. A $\gamma'$ phase ($Ni_3Al$) is a main precipitation strengthening phase, and the strength thereof increases depending on an increase of its temperature. Thus, the $\gamma'$ phase is very effective in improving the strength at a high temperatures. The $\gamma'$ phase is stabilized by adding elements of titanium, niobium, tantalum or the like, and thus is capable of existing at a higher temperature. Therefore, development has been carried out by placing a focus on how the $\gamma'$ phase is stabilized in order to improve a performance of the Ni-based alloy. The added elements such as titanium, niobium, tantalum or the like are liable to produce segregation during solidification, and thus make it difficult to manufacture a large-sized component. Thereupon, the high-strength Ni-based alloy is restricted to a relatively small-sized component such as a rotor/stator blade.

A turbine disc is raised as a typical large-sized component of the gas turbine. A high-chromium ferritic heat resistant steel has been conventionally used as the turbine disc material. Recently, however, the Ni-based alloy has come to be employed due to a demand for use at higher temperatures. A large size ingot exceeding 10 tons has been produced for a heat resistant steel. As for the Ni-based alloy, Alloy 706 having relatively high productivity has been used for the turbine disc. However, a weight thereof is limited to 2 to 3 tons. If the product weight exceeds the value, segregation occurs at the time of production, and cracks are undesirably generated at the time of solidification or at the time of forging, so that it is difficult to produce a larger product.

Alloy 718 is a Ni-based alloy having a strength higher than that of Alloy 706, (see JP-A-2000-192208 and JP-A-2000-192179). However, Alloy 718 contains large amounts of the above-described precipitation strengthening elements to achieve the higher strength, so that segregation is liable to occur as compared with Alloy 706, and it is difficult to produce a large-sized steel ingot. Therefore, it is difficult at present to use Alloy 718 for a large-sized gas turbine.

BRIEF SUMMARY OF THE INVENTION

An object of the invention is to provide a Ni-based heat resistant alloy that has a high-temperature strength, and is less liable to generate segregation by adjusting amounts of added segregation elements, thereby improving a large-sized steel ingot productivity. Another object of the invention is also to provide a gas turbine component including the alloy, and a gas turbine.

The inventors examined an influence of each alloy element on a segregation tendency of the alloy by thermodynamics computation, segregation experiment, and the like. As a result, they found that certain additional range of aluminum, titanium, niobium and molybdenum makes an alloy less liable to generate segregation, thereby improving the large-sized steel ingot productivity.

Thus, the invention provides a Ni-based heat resistant alloy consisting of, by mass percent, carbon: 0.001 to 0.1%, chromium: 16 to 22%, aluminum: 0.5 to 1.5%, molybdenum: 0.1 to 2.0%, tungsten: 0.1 to 6.0%, niobium: 3.5 to 5.5%, titanium: 0.8 to 3.0%, and iron: 16 to 20%, and the balance being nickel and inevitable impurities, wherein a parameter Ps indicating a segregation tendency is in a range of $Ps \geq -3.5$ wherein the parameter Ps is represented by Formula (1).

$$Ps = 1.05 \times Al\ content + 0.6 \times Ti\ content - 0.8 \times Nb\ content - 0.3 \times Mo\ content \qquad (1)$$

The alloy can be used for a gas turbine component such as a turbine disc or a turbine spacer.

According to the above, a large-sized component can be manufactured with the Ni-based heat resistant alloy having a high strength, so that the efficiency of a gas turbine can be increased.

Other objects, features and advantages of the invention will become apparent from the following description of the embodiments of the invention taken in conjunction with the accompanying drawings.

DETAILED DESCRIPTION OF THE INVENTION

The invention will be described in detail with reference to the accompanying drawings.

Figure 1:
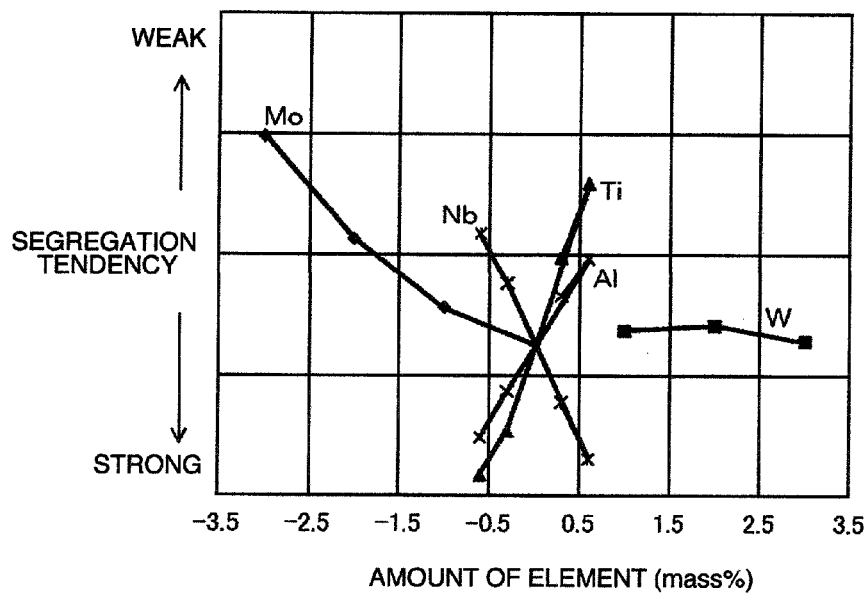
FIG. 1 is a graph showing a relationship between an amount of added alloy element and segregation.

In order to improve large-sized steel ingot productivity, it is necessary to restrain segregation occurring at the time of solidification. The segregation is thought to occur since a solute element is distributed at a solid-liquid interface, and a difference in density is generated in a molten metal. FIG. 1 shows how a segregation tendency changes when an amount of each alloy element is changed with respect to a basic composition of Alloy 718. The segregation is more liable to occur toward a lower side of the figure, and it becomes more difficult to manufacture a large-sized component. As an amount of elements such as molybdenum and niobium, that have an atomic weight larger than that of nickel and are heavier than nickel, are decreased, a difference in molten metal density decreases, so that segregation tends to be restrained. On the contrary, an amount of elements such as aluminum and titanium, that is light in weight, is increased, the difference in molten metal density decreases, so that the segregation tends to be restrained. Although an amount of elements such as chromium, tungsten and iron is changed, an influence thereof on the segregation tendency is scarcely seen.

Therefore, when elements having different segregation tendencies, such as molybdenum, niobium, aluminum and titanium are balanced, the difference in density in molten metal is adjusted to restrain segregation, whereby both of excellent high-temperature strength and high large-sized steel ingot productivity can be achieved.

Compositional range of each alloy element of the invention and a reason why the alloy element is selected are described below.

Carbon (C) solid-solutes in a matrix to improve a tensile strength at a high temperatures, and forms a carbide such as MC, or $M_{23}C_6$ to improve a grain-boundary strength. These effects are remarkable when a carbon content is about 0.001% or higher. However, excessive addition of carbon produces coarse eutectic carbides, which decreases toughness. Therefore, upper limit of the carbon content is 0.1%. An amount of carbon is preferably 0.03 to 0.08%. If the amount exceeds 0.1%, for example, coarse carbides precipitate concentratedly, which impair the strength.

Chromium (Cr) improves oxidation resistance and high-temperature corrosion resistance since it forms a dense oxide film of $Cr_2O_3$ on a surface of the alloy. At least 16% of chromium is to be contained in order that the alloy is applied to a high-temperature component that the invention objects. If chromium is contained greater than 22%, however, σ phase precipitates and thus ductility and fracture toughness of the material are deteriorated. Therefore, chromium content is in a range not exceeding 22%. A preferable content is 17 to 20%.

Aluminum (Al) forms ($Ni_3Al$) phase, and is indispensable for strengthening a γ' phase strengthening type Ni-based alloy. Also, aluminum has an effect of improving oxidation resistance. If aluminum is insufficient, an amount of γ' phase precipitation after aging becomes small, so that a sufficient high-temperature strength can not be obtained. Since titanium and niobium, which are also strengthening elements, are contained in relatively large amounts in the invention, strengthening effect can be achieved when the aluminum content is about 0.5% or higher. Excessive addition of aluminum promotes occurrence of a hard and brittle harmful phase. Therefore, upper limit of aluminum content is 1.5%. Preferable aluminum range is 0.6 to 1.2%. More aluminum distributes in a liquid phase during solidification, and a difference in density in a molten metal is decreased. Thus, aluminum achieves an effect of reducing segregation.

Molybdenum (Mo) has an effect of strengthening a matrix by solid solution strengthening. Even when a molybdenum content is about 0.1%, it is recognized that strength is improved. The effect increases as an amount of molybdenum increases. However, if molybdenum is added too much, a molten metal density difference increases, and thus segregation becomes liable to occur. Therefore, upper limit of molybdenum content is 2.0%.

Tungsten (W) has very similar influence on the strength as that of molybdenum. Tungsten has an effect of strengthening a matrix due to solid solution strengthening. However, the influence of tungsten on generating segregation is smaller than that of molybdenum. Therefore, increased amount of tungsten can be added to increase a strength. However, if a tungsten content exceeds 6.0%, a hard and brittle intermetallic compound phase is promoted to be formed, or high-temperature forgeability is deteriorated. A preferable tungsten content range is 1.0 to 5.0%.

Niobium (Nb) is a γ' precipitation strengthening element, like aluminum, and improves a high-temperature strength. Further, 3.5% or more of niobium is added in the invention, since a strengthening phase γ" ($Ni_3Nb$) having a crystal structure very similar to that of the γ' phase is formed to further increase a strength. However, excessive addition of niobium causes precipitation of harmful phase, like aluminum. Therefore, upper limit of niobium content is 5.5%. As described above, segregation tendency deteriorates as an amount of niobium increases. Therefore, preferable niobium content ranges not exceeding 5.0% from a viewpoint of large-sized steel ingot productivity.

Titanium (Ti) is a γ' precipitation strengthening element and contributes to improvement of high-temperature strength, like aluminum and niobium. Even if titanium is added in a minute amount, this effect can be recognized. However, from a viewpoint of the improvement in segregation tendency, at least 1.0% of titanium needs be added. Excessive addition of titanium forms an intermetallic compound other than the γ' phase, like aluminum and niobium, and impairs ductility and high-temperature workability. Therefore, upper limit of titanium content is 3.0%.

Iron (Fe) has ductility higher than that of nickel, and addition of iron improves hot workability. Also, since iron is lower in cost than other elements, iron has an effect of decreasing material cost. However, excessive addition of iron makes γ' phase unstable, which is a strengthening phase. Thus, high-temperature strength is decreased. Therefore, an iron content ranges from 16 to 18%.

Furthermore, since niobium and molybdenum has contradictory effects with aluminum and titanium as described above concerning large-sized steel ingot productivity, contents of these elements should be adjusted so that a parameter Ps represented by Formula (1) meets a certain relationship.

$$Ps=1.05\times Al\ content+0.6\times Ti\ content-0.8\times Nb\ content-0.3\times Mo\ content \quad (1)$$

By selecting an alloy composition satisfying Ps≥−3.5, a large-sized steel ingot productivity is improved, which is an object of the invention. Therefore, a large-sized forged component such as a gas turbine disc can be manufactured. Preferable range of Ps is Ps≥−3.0.

EXAMPLES

Hereinafter, examples of the invention are explained.

Table 1 gives alloy compositions of specimens. Alloys of 10 kg and having compositions in Table 1 were produced in a vacuum induction melting furnace. Nos. 1 to 8 are alloys of the invention (hereinafter, referred to as invention alloys), and Nos. 9 to 11 are comparative alloys. The alloy of No. 9 corresponds to commercially-available Alloy 718. The produced alloys were subjected to removal of oxide film and casting defects from surfaces, and thereafter were hot worked into a round bar shape having 15 mm diameter. From the round-bar stock, various test pieces were taken, and the mechanical properties of the material were evaluated by Vickers hardness test at a room temperature and high-temperature tensile test at 700° C. Also, apart from the 10 kg alloy, a test simulating manufacturing conditions of a large-sized steel ingot was conducted. In the test, presence of segregation was checked, and occurrence tendency of segregation was evaluated.

The results of various tests are given in Table 2.

TABLE 1

| | No. | Composition (mass %) | | | | | | | | | |
|---|---|---|---|---|---|---|---|---|---|---|---|
| | | Ni | C | Cr | Al | Mo | W | Nb | Ti | Fe | Ps |
| Invention alloy | 1 | Balance | 0.03 | 19.0 | 0.6 | 2.0 | 0.0 | 4.2 | 0.9 | 18.5 | −2.75 |
| | 2 | Balance | 0.03 | 19.0 | 0.6 | 2.0 | 0.0 | 5.2 | 1.9 | 18.5 | −2.95 |
| | 3 | Balance | 0.03 | 19.0 | 0.6 | 0.0 | 4.0 | 5.2 | 0.9 | 18.5 | −2.95 |
| | 4 | Balance | 0.03 | 19.0 | 0.6 | 0.0 | 4.0 | 4.7 | 1.9 | 18.5 | −1.99 |
| | 5 | Balance | 0.03 | 19.0 | 1.1 | 1.0 | 2.0 | 5.2 | 0.9 | 18.5 | −2.73 |
| | 6 | Balance | 0.08 | 18.0 | 1.1 | 1.0 | 2.0 | 4.7 | 1.2 | 17.5 | −2.19 |
| | 7 | Balance | 0.08 | 18.0 | 0.6 | 2.0 | 2.0 | 5.2 | 1.2 | 17.5 | −3.41 |
| | 8 | Balance | 0.08 | 19.0 | 0.6 | 1.5 | 0.0 | 5.0 | 0.9 | 18.5 | −3.28 |
| Comparative alloy | 9 | Balance | 0.03 | 19.0 | 0.6 | 3.0 | 0.0 | 5.2 | 0.9 | 18.5 | −3.85 |
| | 10 | Balance | 0.03 | 19.0 | 0.6 | 1.5 | 1.0 | 5.5 | 0.5 | 18.5 | −3.92 |
| | 11 | Balance | 0.08 | 19.0 | 0.6 | 2.0 | 2.0 | 5.2 | 0.9 | 18.5 | −3.59 |

TABLE 2

| | No. | Vickers hardness (at room temperature) | High-temperature tensile test result (at 700° C.) | | | Segregation test result |
|---|---|---|---|---|---|---|
| | | | 0.2% yield stress/MPa | Tensile stress/MPa | Elongation/% | |
| Invention alloy | 1 | 378 | 809 | 992 | 16 | no segregation |
| | 2 | 369 | 810 | 1012 | 19 | no segregation |
| | 3 | 385 | 821 | 1008 | 15 | no segregation |
| | 4 | 390 | 830 | 1010 | 17 | no segregation |
| | 5 | 381 | 822 | 990 | 19 | no segregation |
| | 6 | 376 | 818 | 983 | 17 | no segregation |
| | 7 | 370 | 827 | 994 | 16 | no segregation |
| | 8 | 380 | 826 | 1002 | 19 | no segregation |
| Comparative alloy | 9 | 383 | 825 | 1005 | 18 | segregation |
| | 10 | 375 | 813 | 982 | 16 | segregation |
| | 11 | 371 | 810 | 985 | 19 | slight segregation |

From Table 2, much difference is not found between the invention alloy and the comparative alloy concerning the Vickers hardness and tensile strength. Both of the invention alloy and the comparative alloy exhibit excellent strength properties almost equivalent to those of Alloy 718 having been used as a commercially-available material.

In the evaluation of segregation properties, much difference was found between the invention alloy and the comparative alloy. In Table 2, alloys in which segregation was not observed in the segregation simulating test are indicated by "no segregation". Alloys in which segregation was observed, and the workability and properties were deteriorated greatly are indicated by "segregation". An alloy in which a slight segregation was observed is indicated by "slight segregation".

Segregation was not recognized in all of the invention alloys, and the alloys have extremely high productivity. Producing 5-ton steel ingot was assumed in this test conditions. It can be presumed that if segregation does not occur in this test, a large-sized steel ingot can be actually produced without the occurrence of segregation. Occurrence of segregation was recognized in the comparative alloys of Nos. 9 and 10. A slight segregation was recognized in the alloy No. 11. Chemical composition becomes nonuniform in the ingots in which segregation occurred, and thereby the strength is decreased locally. Thus, workability and strength are impaired greatly. For comparative alloys of Nos. 9 and 10, it can be judged that a large-sized steel ingot of about 5 tons is difficult to produce. Ps value calculated from the alloy composition of No. 11 alloy in which a slight segregation was recognized was −3.59, and the smallest Ps value among the invention alloys was −3.42 of No. 8 alloy. Therefore, the threshold value of segregation occurrence was −3.5. Some invention alloys have the Ps value greatly exceeding the threshold value, and the alloys are thought to be further less liable to produce segregation and to be excellent in large-sized steel ingot productivity. It is presumed that a large-sized steel ingot of 10 tons or heavier can be produced, if Ps≥−3.0.

As described above, a large-sized steel ingot can be produced without the occurrence of segregation while having excellent high-temperature strength equivalent to those of Alloy 718, by properly controlling the amounts of segregation elements according to the invention.

Figure 2:
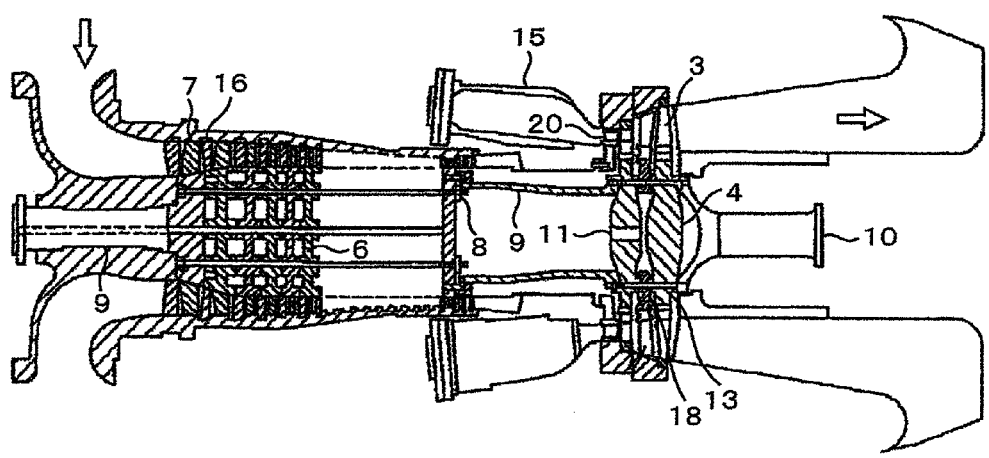
FIG. 2 is a schematic view of a gas turbine.

FIG. 2 shows an example of a forged component manufactured with the material in accordance with the invention.

FIG. 2 is a schematic view of a gas turbine. In FIG. 2, reference numeral 3 denotes a turbine blade; 4 denotes a turbine disc; 6 denotes a compressor disc; 7 denotes a compressor blade; 8 denotes a compressor stacking bolt; 9 denotes a compressor stub shaft; 10 denotes a turbine stub shaft; 11 denotes a hole; 13 denotes a turbine stacking bolt; 15 denotes a combustor; 16 denotes a compressor nozzle; 18 denotes a turbine spacer; 19 denotes a distant piece; and 20 denotes a first-stage nozzle.

Among the components of the gas turbine shown in FIG. 2, the turbine disc and the turbine spacer are raised as a component required to have a high high-temperature strength and used as a large-sized forged component. The conventional material such as Alloy 718 is difficult to be applied to a large-sized turbine disc because of the difficulty in producing large-sized products. Thus, it is necessary to use a material having a low endurance temperature while a large-sized steel ingot can be produced. This has been a hindrance to the increase in efficiency of the gas turbine.

The alloy in accordance with the invention has a high endurance temperature, and a large-sized steel ingot can be produced which is capable of applied to manufacture of a turbine disc. Therefore, operating temperature can be increased and the efficiency of the gas turbine is improved. The gas turbine in accordance with the invention can also be used for a power generating plant including the gas turbine as shown in FIG. 2 and a generator or a combined cycle power generating plant in which a steam turbine is combined.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A nickel-based heat resistant alloy consisting of, by mass percent, carbon: 0.001 to 0.1%,
chromium: 16 to 22%,
aluminum: 0.5 to 1.5%,
molybdenum: 0.1 to 2.0%,
tungsten: 0.1 to 6.0%,
niobium: 3.5 to 5.5%,
titanium: 0.8 to 3.0%,
iron: 16 to 20%, and
the balance being nickel and inevitable impurities,
wherein a parameter Ps indicating a segregation tendency is in a range of Ps≥−3.5, wherein the parameter Ps is represented by following formula:

$$Ps = 1.05 \times Al\ content + 0.6 \times Ti\ content - 0.8 \times Nb\ content - 0.3 \times Mo\ content.$$

2. The alloy according to claim 1, wherein the parameter Ps is in a range of Ps≥−3.0.

3. A gas turbine disc comprising the alloy according to claim 1.

4. A gas turbine spacer comprising the alloy according to claim 1.

5. A gas turbine comprising the gas turbine disc according to claim 3.

6. A gas turbine comprising the gas turbine spacer according to claim 4.

* * * * *